US007102775B2

(12) United States Patent
Suyehira

(10) Patent No.: US 7,102,775 B2
(45) Date of Patent: Sep. 5, 2006

(54) SYSTEMS AND METHODS FOR DEFINING PRINTING DEVICE GROUPS AND COLLECTION OF USAGE DATA THEREFROM

(75) Inventor: Richard Suyehira, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 753 days.

(21) Appl. No.: 09/929,249

(22) Filed: Aug. 13, 2001

(65) Prior Publication Data

US 2003/0030842 A1 Feb. 13, 2003

(51) Int. Cl.
*G06F 3/12* (2006.01)

(52) U.S. Cl. .................... 358/1.15; 358/1.13; 358/1.16

(58) Field of Classification Search ................ 358/1.1, 358/1.5, 1.12, 1.13, 1.14, 1.15, 468; 399/8
See application file for complete search history.

(56) References Cited

U.S. PATENT DOCUMENTS 5,099,346 A * 3/1992 Lee et al. .................. 398/118
5,812,156 A * 9/1998 Bullock et al. ............... 347/19
6,449,054 B1 * 9/2002 Cox et al. .................. 358/1.15
6,707,566 B1 * 3/2004 Endoh ....................... 358/1.15

* cited by examiner

*Primary Examiner*—Dov Popovici

(57) ABSTRACT

Systems and methods are described for defining groups of printers within an enterprise and collecting printer usage data therefrom. A program executes on a systems administration computer within the enterprise. Printer groups and/or the printers assigned to the printer groups may be created, added, removed, deleted or changed via a graphical user interface on the systems administration computer. Each individual printer collects printer usage data which may be collected from individual printers or groups of printers for analysis and printer management, including maintenance and consumables replacement.

33 Claims, 7 Drawing Sheets

SYSTEMS AND METHODS FOR DEFINING PRINTING DEVICE GROUPS AND COLLECTION OF USAGE DATA THEREFROM

TECHNICAL FIELD

This invention generally relates to defining groups of printing devices and collecting data from the printing devices, and more particularly, to defining and re-defining groups of printing devices having replaceable components and collecting data from the printing devices individually or by one or more groups.

BACKGROUND

Large enterprises, i.e., corporations, typically own several hundred or thousand printing devices, such as laser printers, ink jet printers, fax machines, copiers, plotters, etc. Since a large enterprise is usually divided into smaller departments for organizational management purposes, it simply follows that each department or organization has its own group of printing devices that it exclusively uses, distinctly separate from use by other organizations.

Management of printing devices owned by an enterprise is varied. In some enterprises, each organization handles its own printing device management, managing consumables for the printing devices, adding a printing device, removing a printing device, collecting usage data on the organization's printing devices, etc.

Some enterprises consolidate printing device management into a single department that handles, among other things, the tasks mentioned above. With this arrangement, the printing device management department can take advantage of the higher volume of printing devices when purchases for printing devices or printing device consumables are required. However, there is a tradeoff in efficiency when a single department handles the printing device management for an entire enterprise.

This tradeoff occurs in that it creates an additional layer of management, i.e., bureaucracy, to add, remove, replace, relocate printing devices in or between organizations. Also, collecting usage data and aggregating the data by organizations is more difficult and more time consuming. Additional human resource hours are required to accomplish these tasks and, as such, add to the operating expenses of the enterprise.

SUMMARY

Systems and methods are described herein for defining organizations or specific printing device groups. A program executing on a centralized computer provides a simplified way to organize printing devices into printing device groups. As a result, collecting usage data from the groups is more efficient and reduces enterprise operating costs. The usage data collected may be analyzed automatically or manually to determine more efficient ways to manage the printing devices.

One use of such systems and methods described herein is to track usage data for all the laser printers for each printing device group. A report is generated either on demand or for a defined period of time (monthly, quarterly, etc.) to report on toner usage, pages printed, toner cartridges ordered or required, cost per page, etc.

A user interface allows an operator on the centralized computer to easily add, move or relocate printing devices to, from or within printing device groups. Also, the user interface may be used to re-arrange the printing device groups as required.

In at least one embodiment, printing devices that have replaceable components with component memory are utilized to more easily identify the printing devices and/or collect the usage data. A value may be stored in the component memory that identifies the printing device group to which the printing device containing the replaceable component belongs.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
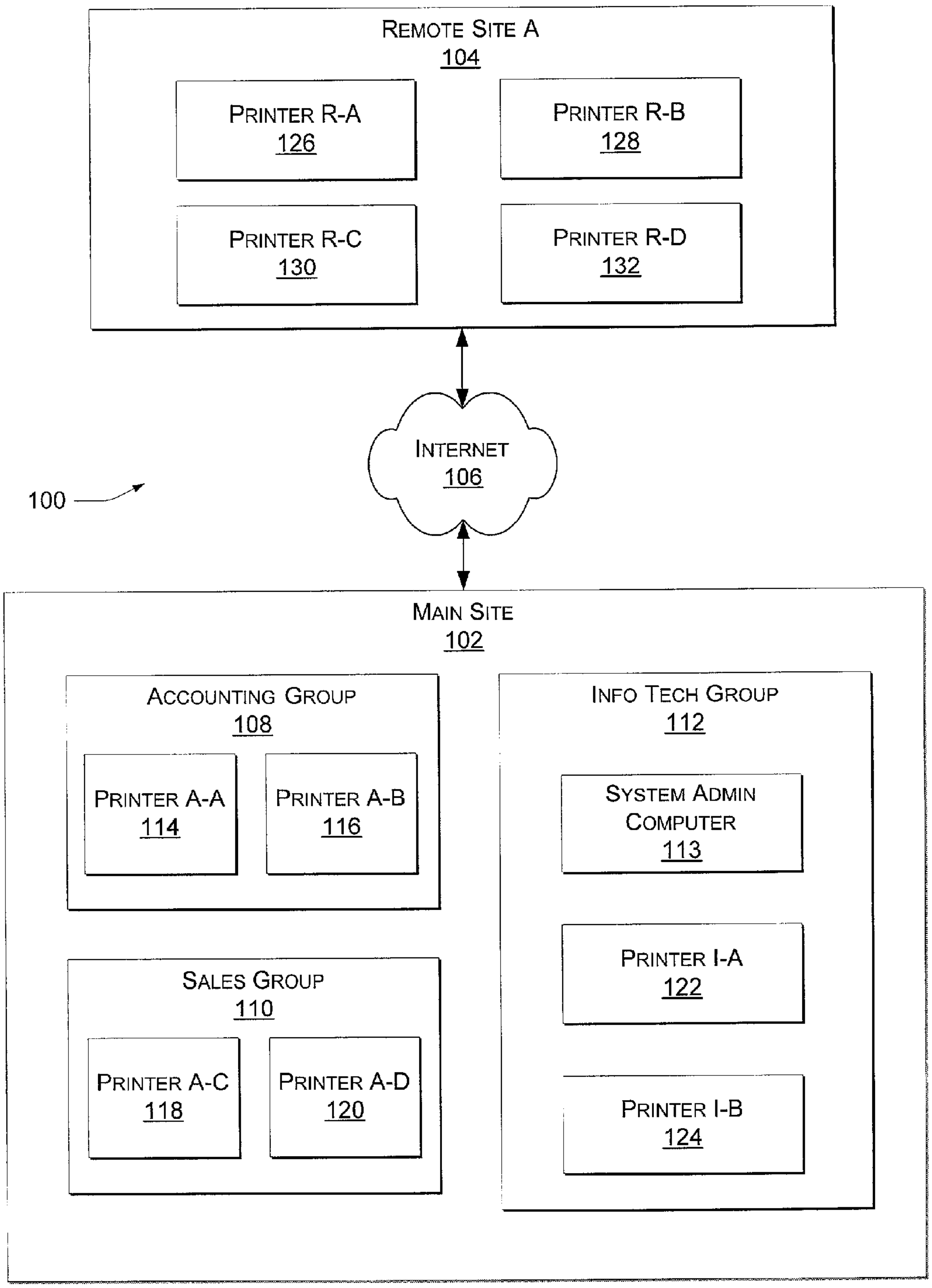
FIG. 1 is a block diagram of an enterprise printing device organization.

The following description sets forth one or more specific implementations and/or embodiments of systems and methods for defining printing device groups and collecting usage data therefrom. The systems and methods incorporate elements recited in the appended claims. These implementations are described with specificity in order to meet statutory written description, enablement, and best-mode requirements. However, the description itself is not intended to limit the scope of this patent.

Also described herein are one or more exemplary implementations of systems and methods that allow definition of printing device groups and collection of usage data therefrom. Applicant intends these exemplary implementations to be examples only. Applicant does not intend these exemplary implementations to limit the scope of the claimed present invention(s). Rather, Applicant has contemplated that the claimed present invention(s) might also be embodied and implemented in other ways, in conjunction with other present or future technologies.

Computer-Executable Instructions

An implementation of a system and/or method for defining specific printing device groupings and collecting usage data therefrom may be described in the general context of computer-executable instructions, such as program modules, executed by one or more computers or other devices.

Generally, program modules include routines, programs, objects, components, data structures, etc. that perform particular tasks or implement particular abstract data types.

Typically, the functionality of the program modules may be combined or distributed as desired in various embodiments.

Computer-Readable Media

An implementation of a system and/or method for defining printing device groups and collecting usage data from one or more of the printing device groups may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communications media" typically embodies computer-readable instructions, data structures, program modules, or other data in a modulated data signal, such as carrier wave or other transport mechanism. Communication media also includes any information delivery media.

Exemplary Enterprise and Printing Device Distribution

FIG. 1 is a block diagram of an enterprise 100 that depicts the printing device distribution or organization within the enterprise 100. The enterprise 100 includes a main site 102 and a remote site A 104. The enterprise 100 may also include additional remote sites; however, for discussion purposes, only remote site A 104 is shown in FIG. 1. The main site 102 and remote site A 104 are configured to communicate via the Internet 106.

The main site 102 includes an accounting group 108, a sales group 110 and an information technology group 112. The groups 108–112 represent divisions, departments or organizations within the enterprise 100. The information technology group 112 includes a systems administration computer 113 which controls the grouping of printing devices and collection of data therefrom and which will be discussed in greater detail below with reference to other figures.

Each of the groups 108–112 has one or more printing devices assigned thereto. Although only the generic term "printing device" has been previously used in this description, the typically more specific term "printer" will be used hereinafter. However, it should be understood that use of the term "printer" is for convenience only and that the use is not intended to limit the scope of the discussion to this point. As used hereinafter, the term "printer" includes any device having the capability to print characters, lines, symbols, etc. on some form of print media. Examples of printers include, but are not limited to, laser printers, ink jet printers, dry medium printers, electro-thermographic printers, ribbon printers, dot matrix printers, facsimile machines, copy machines, plotters, and the like.

The accounting group 108 includes printer A—A 114 and printer A-B 116. The sales group 110 includes printer S-A 118 and printer S-B 120. The information technology group 112 includes printer I-A 122 and printer I-B 124.

Remote site A 104 also includes several printers. Shown as included in remote site A 104 are printer R-A 126, printer R-B 128, printer R-C 130 and printer R-D 132. The printers 126–132 at remote site A 104 may be accessed and/or controlled by the systems administration computer 113 of the information technology group 112 at the main site 102. Further aspects of this feature will be discussed below with reference to the following figures.

Exemplary Systems Administration Computer

Figure 2:
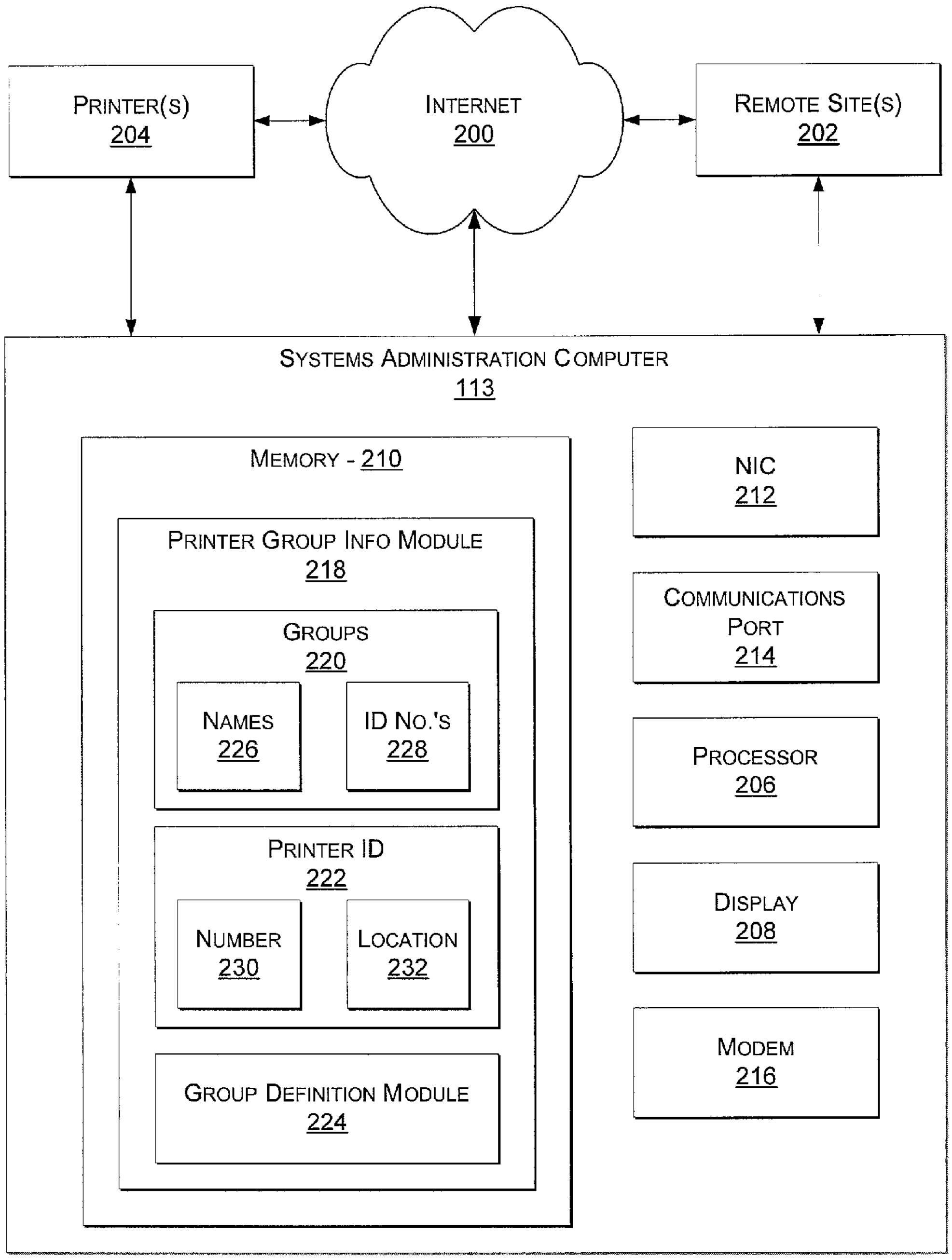
FIG. 2 is a block diagram of a systems administration computer having the capability to define printing device groups.

FIG. 2 is a block diagram of the systems administration computer 113 shown in FIG. 1, which has the capability to define printer groups throughout the enterprise 100. Also shown in FIG. 2 is the Internet 200, which provides a way for the systems administration computer 113 to connect with one or more remote sites 202 and printers 204 within the enterprise, but remote from the systems administration computer 113.

The systems administration computer 113 includes a processor 206, a display 208 and memory 210. For external communications, the systems administration computer 113 is equipped with a network interface card (NIC) 212, a communications port 214 (e.g., a parallel port), and a modem 216.

While the systems administration computer 113 is shown as having the NIC 212, the communications port 214 and the modem 216, it is noted that the systems administrations computer 113 may have only one or more of these devices, depending on the configuration of the environment of the systems administration computer 113.

The memory 210 includes a printer group information module 218. The printer group information module 218 is the program that allows the systems administration computer 113 to define printer groups and associate different printers with one or more of the printer groups. Further aspects of the printer group information module 218 will be discussed in greater detail below.

The printer group information module 218 includes a groups module 220, a printer identification (ID) module 222 and a group definition module 224. The groups module 220 includes a names component 226 and an identification (ID) number component 228. The groups module 220 stores the name(s) of one or more printer groups defined by the group definition module 224. The ID number component 228 is optional and includes an identification number that may be associated with each of the printer group(s) stored in the names component 226.

The printer identification (ID) module 222 includes a number component 230 and a location component 232. The number component 230 stores an identification number of each printing device defined by the group definition module 224, the identification number of a printer uniquely identifying the printer within the enterprise 100. The identification number may be the printer serial number or a number (or name) assigned to the printer within the enterprise 100. The location component 232 identifies a location of each printer identified in the number component 230. This identification may be a literal location of the printer, e.g., room A120, or it may be an arbitrary name of a location denoted by the enterprise 100, e.g., main mail room. It is noted that the location component 232 is optional and need not be used to attain the advantages of the invention(s) described herein.

The group definition module 224 provides a way for a user of the systems administration computer 113 to define printer groups and assign each enterprise printer to a printer group As will be discussed in greater detail below, the group definition module 224 provides a user interface (not shown)

that allows a systems administration computer 113 user to accomplish these tasks with desirable efficiency.

Exemplary Printing Device

Figure 3:
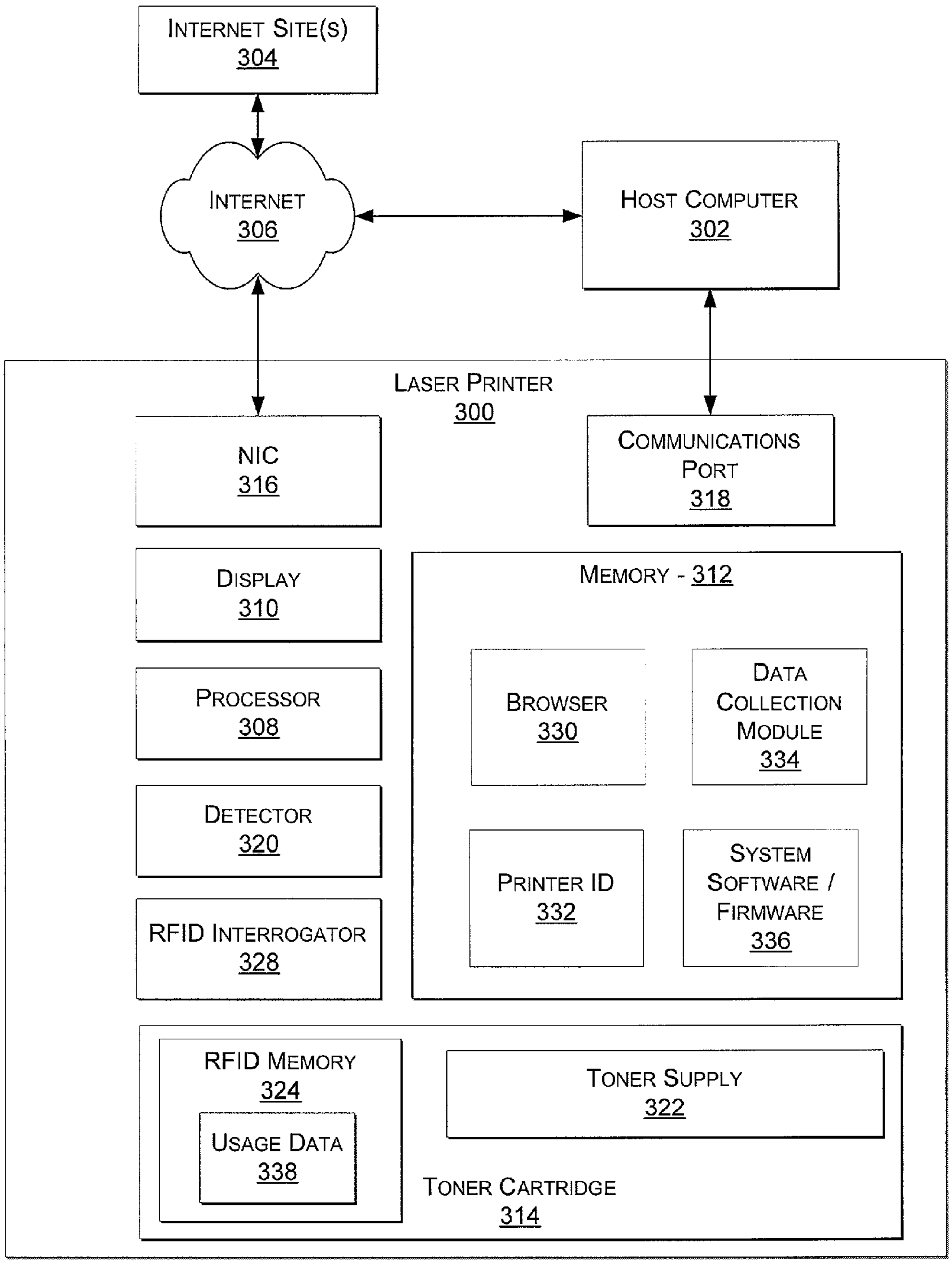
FIG. 3 is a block diagram of a laser printer having the capability to provide collect, store and report usage data to a centralized authority.

FIG. 3 is a block diagram of a laser printer 300 within an environment suitable for implementation of the invention(s) described herein. The laser printer 300 has the capability to communicate with a host computer 302 or with one or more Internet sites 304 via the Internet 306.

The laser printer 300 includes a processor 308, a display 310, memory 312 and a toner cartridge 314. The laser printer 300 also includes a network interface card (NIC) 316 that enables communication with a network, such as the Internet 306. A communications port 318 is also includes in the laser printer 300 that enables communication between the laser printer 300 and the host computer 302.

The laser printer 300 further includes a detector 320 that is configured to detect the occurrence of an event within the laser printer, such as a low toner event in the toner cartridge 314.

The toner cartridge 314 includes a toner supply 322 and radio frequency identification (RFID) memory 324. Although the toner cartridge 314 is shown as having RFID memory 324, it is noted that any other type of memory known in the art may be utilized to accomplish the goals of the invention(s) described herein, e.g., semiconductor memory, magnetic strip memory, and the like. Furthermore, those skilled in the art will recognize that the objectives of the present invention(s) may be accomplished without using printer components with memory. However, a printer component—namely, the toner cartridge 314—is shown herein with component memory (i.e., the RFID memory 324) as an exemplary implementation of the present invention(s). The RFID memory 324 stores printer usage data 326 collected from the laser printer 300. This will be discussed in greater detail below.

To complement the RFID memory 324, an RFID interrogator 328 is included in the laser printer 300. The RFID interrogator 328 is configured to read from and, possibly, to write to the RFID memory 324 of the toner cartridge 314. Uses of RFID memory and methods to read from and write to RFID memory are well known in the art and will not be discussed in detail herein.

The memory 312 of the laser printer 300 includes a browser 330 that is configured to browse a network, such as the Internet 306. The memory 312 also stores a printer identifier 332 that uniquely identifies the laser printer 300. This may be a laser printer 300 serial number assigned by the manufacturer of the laser printer 300 or it may be a number assigned by the enterprise 100 that owns and/or operates the laser printer 300.

The memory 312 also stores a data collection module 334 and system software/firmware 336. The data collection module 334 is configured to collect and store usage data 338 from the laser printer 300 in the RFID memory 324 or in memory 312. Typical usage data that might be collected by the data collection module includes, but is not limited to, date of installation one or more components, total page count, pages printed using the toner cartridge 314, average number of pages included in a print job, number of print jobs, initiators of print jobs, printer settings, etc.

Exemplary Printing Device Replaceable Component with Memory

Figure 4:
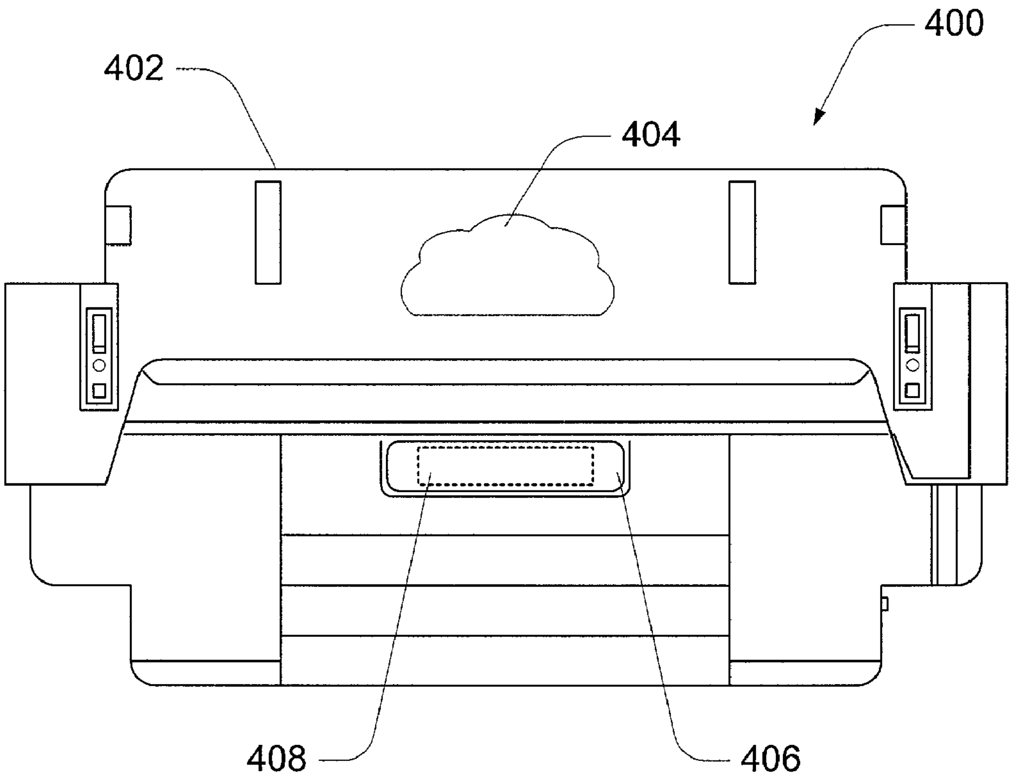
FIG. 4 is an illustration of a toner cartridge having component memory.

FIG. 4 is an illustration of a toner cartridge 400 that is installable in a laser printer 300 (as shown in FIG. 3) and is suitable for use in the invention(s) described herein. Although the invention is shown and described herein utilizing a printer toner cartridge 314 for a laser printer 300, it is noted that the invention may be utilized with any replaceable component (toner cartridge, ink cartridge, imager drum, fuser, etc.) installable in a printing device (printer, copier, fax machine, etc.). The toner cartridge 400 includes a cartridge body 402 that contains a toner supply 404.

A memory tag 408 is located underneath a label 406 on the toner cartridge 400, although the memory tag 408 may be placed on the toner cartridge 400 at any location which may be practical for the purposes described herein. The memory tag 408, as previously described, is a radio frequency identification (RFID) memory tag. RFID memory tags and applications therefore are well known in the art. Further aspects of the functionality of the RFID memory tag 408 in the present invention(s) will become clearer as the discussion progresses. It is noted that, although the toner cartridge 400 is shown as having component memory integrated therewith, those skilled in the art will recognize that the present invention(s) may be implemented with replaceable components that do not include component memory.

Exemplary Graphical User Interface

Figure 5:
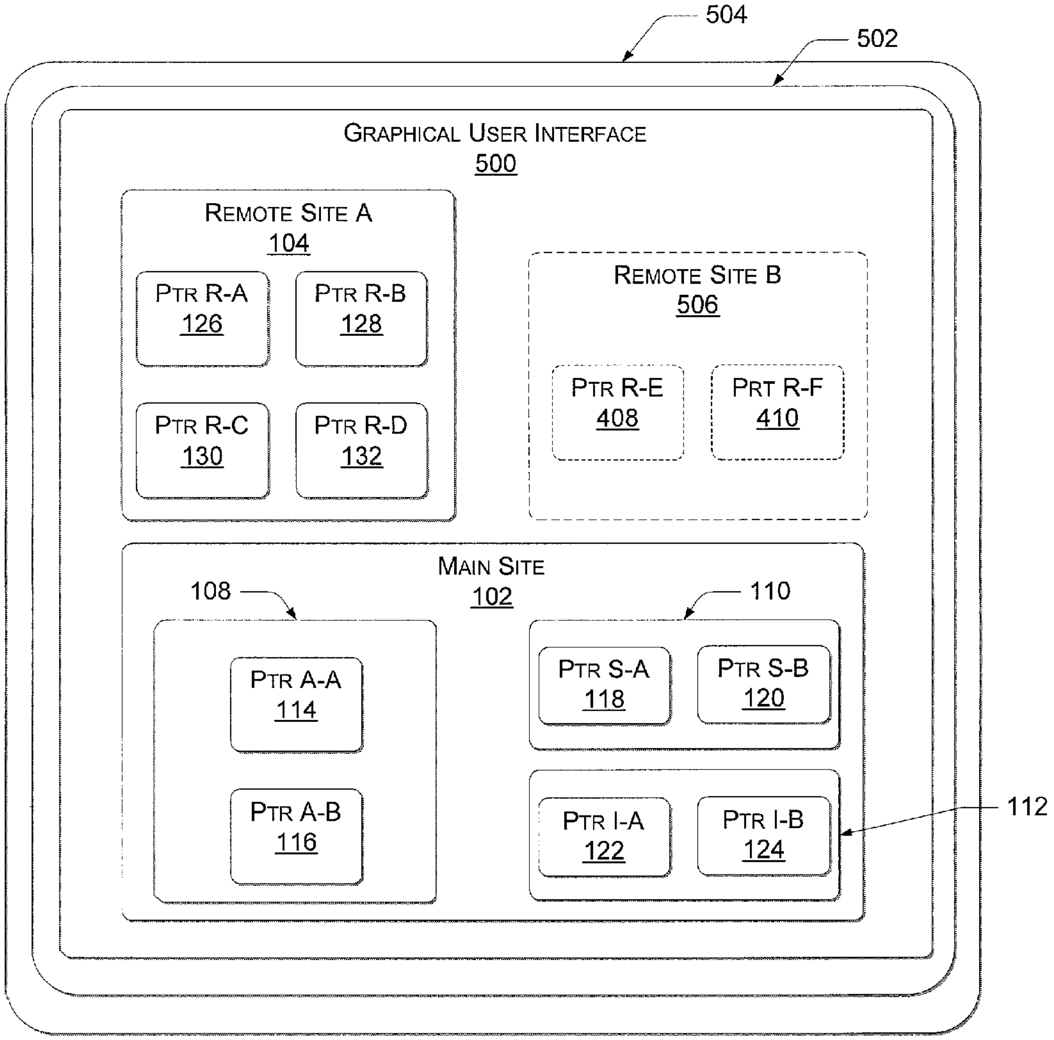
FIG. 5 is an illustration of a graphical user interface, which may be used to implement the systems and methods described herein.

FIG. 5 is an illustration of an exemplary graphical user interface 500 that may be used in one or more implementations of the present invention(s). The graphical user interface 500 is shown displayed on a monitor 502 within a monitor housing 504. For discussion purposes, the graphical user interface 500 will be described according to the enterprise 100 shown in FIG. 1 and the groups and printers shown therein.

The graphical user interface (GUI) 500 shows the main site 102 as well as remote site A 104. The printers 126–132 included in remote site A 104 are depicted within the representation of remote site A 104 in the GUI 500.

Although not included in the enterprise 100 shown in FIG. 1, FIG. 5 indicates that another remote site, remote site B 506, with printer R-E 508 and printer R-F 510 could also be included. This is shown simply to indicate that one or more other remote sites having one or more printers may also be included in the system(s) described herein.

The main site 102 depicts the accounting group 108 with printer A—A 114 and printer A-B 116. The sales group 110 and its printers, printer S-A 118 and printer S-A 120, are also depicted by the GUI 500. The GUI 500 also depicts the information technology (I/T) group 112. Within the depiction of the I/T group 112 are printer I-A 122 and printer I-B 124.

The GUI 500 may provide any method known in the art for editing the arrangement of the groups and or printers within the groups. For example, the GUI may allow cut and paste operations to add a printer to, remove a printer from, or move a printer from one group to another. Alternatively, a drag-and-drop method of performing the same operations may be applied, wherein printer A—A 114 may be dragged to within the sales group 110 and designated as printer S-C (not shown).

By allowing a user a graphical depiction of the printers within the enterprise 100, management of printer groups and individual printers within the groups becomes far more efficient.

Methodological Implementation of a Printer Group Definition

Figure 6:
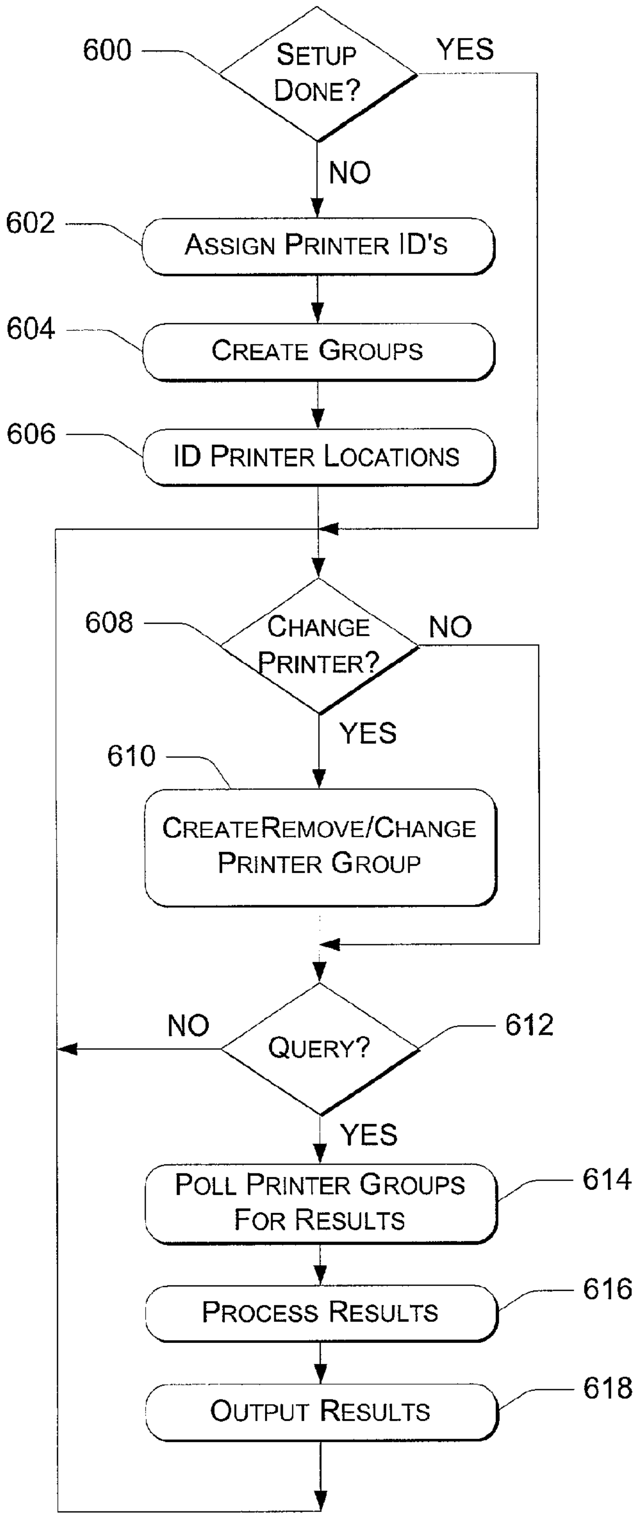
FIG. 6 is a flow diagram depicting a method for defining printing device groups and collecting usage data therefrom.

FIG. 6 is a flow diagram depicting a methodological implementation of the system described herein that allows enterprise printers to be associated with groups and for printer usage data to be collected and analyzed according to the printer groups. Continuing reference in the discussion of the methodological implementation may be made to the features and reference numerals recited in the previous figures.

At block 600, it is determined if an initial setup has already been run on the systems administration computer 113 to set up printer groups and associate printers with the groups. If the setup has not been done ("No" branch, block 600), at block 602 a printer identifier is assigned to each printer in the enterprise 100. A manufacturer serial number may be used for this purpose or unique identifiers may be derived for the enterprise printers.

At block 604, the printer groups are created and each printer is assigned to one or more of the printer groups. This is accomplished by the group definition module 224. A printer group includes a printer group name and printer identifiers of the one or more printers associated with the group. This information is stored in the groups module 220, particularly in the names component 226 and the ID number component 228.

In one alternative implementation shown at block 606, physical locations of the printers are stored by storing the printer identifier associated with a printer (stored in the number component 230) with the location of the printer (stored in the location component 232). This aids in maintaining the printers, allowing maintenance personnel to easily identify a printer's location and get to the printer to maintain the printer.

If the setup has already been performed ("Yes" branch, block 600), then block 602, 604 and 606 are bypassed and the process continues at block 608.

At block 608, it is determined whether a change should be made in the printer groups, such as adding a printer to a group, removing a printer from a group, moving a printer from one group to another, etc. If a change is to be made ("Yes" branch, block 608), the a printer identifier associated with the affected printer is added to, removed from, or changed to a group, depending on the desired action (block 610). If no change is required ("No" branch, block 608), then the process continues at block 612.

At block 612, if a query for printer usage data is received ("Yes" branch, block 612), then the printer groups are polled for query results at block 614.

After the systems administration computer 113 receives the results, then the results are processed at block 616. The results may be processed as requested by the system administrator computer 113 user, such as by individual printer group, subsets of printer groups, individual printers, etc. The results are then output at block 618 for analysis.

Methodological Implementation of a Printer Group Data Collection

Figure 7:
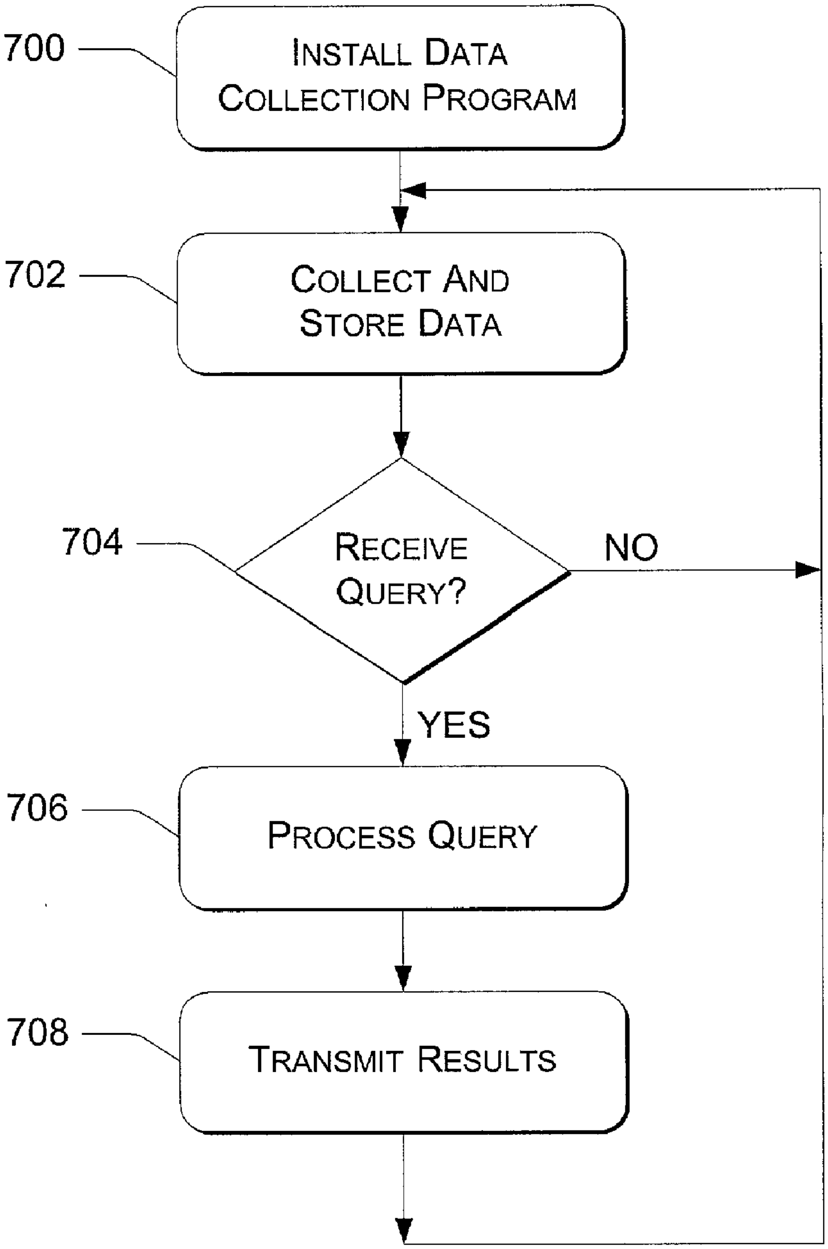
FIG. 7 is a flow diagram depicting a method for use in a printing device to collect usage data and report the usage data in response to a query from a centralized authority.

FIG. 7 is a flow diagram that depicts a method for use in a printing device to collect usage data and report the usage data in response to a query from a centralized authority. At block 700, the printer group information module 218 is installed in the systems administration computer 113. At block 702, printer usage data is collected and stored at each individual printer. If a query for the collected printer usage data is received ("Yes" branch, block 704), then the query is processed by each individual printer at block 706 and transmitted to the systems administration computer 113 at block 708. As long as no query is received ("No" branch, block 704), the printers continue to collect usage data and store the collected data in printer memory.

Conclusion

Implementation of the printer group definition and printer usage data collection systems and methods described herein provide efficient ways for enterprises using printing devices to define printer groups and manipulate printing devices within the printer groups. Furthermore, the collected data can be analyzed according to printer groups and printer maintenance, providing more efficient ways to service and maintain the enterprise printers.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method, comprising:

creating a plurality of printer groups;

for each of a plurality of printers, associating the printer with one or more of the printer groups by assigning a printer identifier with at least one of the one or more printer groups, the printer identifier uniquely identifying the printer;

collecting data from one or more of the plurality of printers;

aggregating the collected data by printer group for one or more of the printer groups;

processing the aggregated data; and moving a printer associated with a first group to a second group by dissociating the printer identifier from the first group and associating the printer identifier with the second group.

2. The method as recited in claim 1, further comprising creating the printer identifier for each printer.

3. The method as recited in claim 1, further comprising adding an additional printer to one or more of the printer groups by associating a printer identifier with the one or more printer groups, the printer identifier uniquely identifying the additional printer.

4. The method as recited in claim 1, further comprising removing a printer from one or more of the printer groups by dissociating the printer identifier associated with the printer from the one or more printer groups.

5. The method as recited in claim 1, further comprising adding an additional printer group to the one or more printer groups.

6. The method as recited in claim 1, further comprising removing a printer group from the one or more printer groups.

7. The method as recited in claim 1, wherein the collecting data from one or more of the plurality of printers comprises collecting printer usage data from printer memory in one or more of the printers from which the printer usage data is collected.

8. The method as recited in claim 1, wherein the collecting data from one or more of the plurality of printers comprises collecting printer usage data from component memory integrated into a replaceable component installed into one or more of the printers from which the printer usage data is collected.

9. The method as recited in claim 1, wherein the one or more printer groups include printers from a first physical location and a second physical location.

10. The method as recited in claim 9, wherein the first physical location is a main site and the second physical location is a remote site.

11. A method, comprising:
creating a plurality of printer groups;
for each of a plurality of printers, associating the printer with one or more of the printer groups by assigning a printer identifier with at least one of the one or more printer groups, the printer identifier uniquely identifying the printer;
presenting the one or more printer groups and the printers associated with the one or more printer groups in a user interface;
collecting data from one or more of the plurality of printers;
aggregating the collected data by printer group for one or more of the printer groups;
processing the aggregated data; and
moving a printer associated with a first group to a second group by dissociating the printer identifier from the first group and associating the printer identifier with the second group.

12. The method as recited in claim 11, further comprising allowing printers to be added or removed from printer groups via the user interface.

13. The method as recited in claim 11, further comprising allowing printer groups to be added via the user interface.

14. The method as recited in claim 11, further comprising allowing printers associated with printer groups to be rearranged using a drag and drop method via the user interface.

15. The method as recited in claim 11, further comprising allowing printers to be associated with or dissociated from printer groups using a cut and paste method via the user interface.

16. A printer, comprising:
a printer identifier that uniquely identifies the printer;
a data collection module configured to collect printer usage data from the printer;
a connection to a host computer, the host computer configured to associate the printer identifier with one or more printer groups identified by the host computer;
a memory component integrated into a replaceable component of the printer; and
printer usage data stored in the memory.

17. The printer as recited in claim 16, further comprising a browser, and wherein the connection to the host computer is accomplished via the browser.

18. The printer as recited in claim 16, further comprising a network interface card, and wherein the connection to the host computer is accomplished via the network interface card.

19. The printer as recited in claim 16, further comprising a communications port connected to a host computer, and wherein the connection to the host computer is accomplished via the communications port.

20. The printer as recited in claim 16, wherein the data collection module is further configured to collect data demarcated by one or more time frames.

21. A system, comprising:
a processor;
memory;
at least one data port for transmitting data to and receiving data from a plurality of printers, each printer having a printer identifier that uniquely identifies the printer; and
a printer group information module configured to associate each printer with a printer group, collect printer usage data from the printers of one or more printer groups, aggregate the printer usage data, and move a printer associated with a first group to a second group by dissociating the printer identifier from the first group and associating the printer identifier with the second group.

22. The system as recited in claim 21, wherein the printer group information module is further configured to add one or more printers to a printer group.

23. The system as recited in claim 21, wherein the printer group information module is further configured to remove one or more printers from a printer group.

24. A computing device programmed to present a user interface that allows a user to perform the following functions on the computing device:
create a plurality of printer groups;
for each of a plurality of printers, associate a printer with one or more of the printer groups by assigning a printer identifier with at least one of the one or more printer groups, the printer identifier uniquely identifying the printer;
collect data from one or more of the plurality of printers;
aggregate the collected data by printer group for one or more of the printer groups; and
move a printer associated with a first group to a second group by dissociating the printer identifier from the first group and associating the printer identifier with the second group.

25. The computing device as recited in claim 24, further programmed to allow a printer group to be added via the user interface.

26. The computing device as recited in claim 24, further programmed to allow a printer group to be removed via the user interface.

27. The computing device as recited in claim 24, further programmed to allow a printer to be added to one or more printer groups via the user interface.

28. The computing device as recited in claim 24, further programmed to allow a printer to be removed from one or more printer groups via the user interface.

29. A computing device, comprising:
memory; and
a processor configured to process computer-executable instructions to perform the following functions:
associating a printer identifier from each of a plurality of printers with one or more of multiple printer groups;
collecting printer usage data from the printers associated with one or more of the printer groups;
aggregating the collected data according to printer group; and
moving a printer associated with a first group to a second group by dissociating the printer identifier from the first group and associating the printer identifier with the second group.

30. The computing device as recited in claim 29, wherein the processor is further configured to add a new printer to one or more of the printer groups by associating a printer identifier for the new printer with the printer groups.

31. The computing device as recited in claim 29, wherein the processor is further configured to remove a printer from one or more of the printer groups by dissociating the printer identifier for the printer from the printer groups.

32. The computing device as recited in claim 29, wherein the processor is further configured to create a new printer group and associate a printer identifier from one or more of the plurality of printers with the new printer group.

33. The computing device as recited in claim 29, wherein the processor is further configured to remove a printer group and dissociate any printer identifiers associated with the printer group from the removed printer group.

* * * * *